(12) United States Patent
Mizuno et al.

(10) Patent No.: US 9,180,774 B2
(45) Date of Patent: Nov. 10, 2015

(54) WORK VEHICLE

(75) Inventors: Hiroyuki Mizuno, Uji (JP); Tomomi Ueda, Hirakata (JP)

(73) Assignee: KOMATSU LTD., Tokyo (JP)

( * ) Notice: Subject to any disclaimer, the term of this patent is extended or adjusted under 35 U.S.C. 154(b) by 522 days.

(21) Appl. No.: 13/515,452

(22) PCT Filed: May 27, 2011

(86) PCT No.: PCT/JP2011/062202
§ 371 (c)(1),
(2), (4) Date: Jun. 12, 2012

(87) PCT Pub. No.: WO2011/152306
PCT Pub. Date: Dec. 8, 2011

(65) Prior Publication Data
US 2012/0247861 A1    Oct. 4, 2012

(30) Foreign Application Priority Data

May 31, 2010   (JP) ................. 2010-124903

(51) Int. Cl.
*B60K 13/04* (2006.01)
*F01N 3/035* (2006.01)
(Continued)

(52) U.S. Cl.
CPC ............. *B60K 13/04* (2013.01); *E02F 9/0866* (2013.01); *F01N 3/00* (2013.01); *F01N 13/1805* (2013.01); *B60Y 2200/412* (2013.01); *F01N 2590/08* (2013.01); *Y02T 10/20* (2013.01)

(58) Field of Classification Search
CPC ....... F01N 3/0211; F01N 3/025; F01N 3/035; F01N 3/05; F01N 3/06; F01N 3/2842; F01N 3/2882; B01D 53/9431; B60K 11/00; B60K 11/04; B60K 13/04; B60Y 2200/411; B62D 25/10; F01P 11/10; F01P 2060/16; F01P 5/06; F02B 37/164; F02B 3/06; Y02T 10/144; Y02T 10/20; Y02T 10/24
USPC ........... 180/296, 68.3, 309; 60/272, 280, 281, 60/315; 248/49, 58
See application file for complete search history.

(56) References Cited

U.S. PATENT DOCUMENTS 5,081,836 A * 1/1992 Smith et al. .................... 60/280
5,904,042 A * 5/1999 Rohrbaugh .................... 60/298
(Continued)

FOREIGN PATENT DOCUMENTS

JP         7-127448 A      5/1995
JP      2005-320907 A     11/2005
(Continued)

OTHER PUBLICATIONS

International Search Report of corresponding PCT Application No. PCT/JP2011/062202.

*Primary Examiner* — Paul N Dickson
*Assistant Examiner* — Bridget Avery
(74) *Attorney, Agent, or Firm* — Global IP Counselors, LLP

(57) ABSTRACT

In a work vehicle, a second processing device, disposed over a hydraulic pump, is configured to process the hydraulic gas from an engine. A first processing device is disposed closer to the engine than the second processing device is. Further, the first processing device is positioned higher the second processing device. The first processing device is partially overlapped with the second processing device in a top plan view.

9 Claims, 9 Drawing Sheets

(51) Int. Cl.
*E02F 9/08* (2006.01)
*F01N 3/00* (2006.01)
*F01N 13/18* (2010.01)

(56) References Cited

U.S. PATENT DOCUMENTS

| | | | |
|---|---|---|---|
| 8,720,638 B1* | 5/2014 | Nakagami et al. | 180/309 |
| 2010/0122865 A1* | 5/2010 | Okada | 180/309 |
| 2012/0138379 A1* | 6/2012 | Tsuji et al. | 180/309 |
| 2013/0213726 A1* | 8/2013 | Okada | 180/309 |

FOREIGN PATENT DOCUMENTS

| | | |
|---|---|---|
| JP | 2008-156835 A | 7/2008 |
| JP | 2008-240695 A | 10/2008 |
| JP | 2008-302851 A | 12/2008 |
| JP | 2009-108685 A | 5/2009 |
| JP | 2009-184558 A | 8/2009 |
| JP | 2010-116803 A | 5/2010 |

* cited by examiner

WORK VEHICLE

CROSS-REFERENCE TO RELATED APPLICATIONS

This application claims priority to Japanese Patent Application No. 2010-124903 filed on May 31, 2010, the disclosure of which is hereby incorporated herein by reference in its entirety.

TECHNICAL FIELD

The present invention relates to a work vehicle.

BACKGROUND ART

Work vehicles are embedded with an exhaust gas processing device. For example, the exhaust gas processing device is a device configured to reduce nitrogen oxides ($NO_x$), a device configured to reduce carbon monoxide (CO), a device configured to reduce particulate substances or etc. The exhaust gas processing device is connected to an engine through a pipe for processing the exhaust gas from the engine. Therefore, the exhaust gas processing device is accommodated in the inside of a work vehicle together with the engine. Further, as described in Japanese Laid-open Patent Application Publication No. JP-A-2008-156835, some work vehicles are embedded with a plurality of exhaust gas processing devices. In the work vehicle described in the above mentioned publication, two exhaust gas processing devices and the engine are connected in series. The exhaust gas processing devices are disposed in a recess formed in a counterweight. Further, an engine hood is disposed for covering the exhaust gas processing devices as well as the engine.

SUMMARY

The other devices (e.g., a hydraulic pump) other than the engine are accommodated in the inside of the work vehicle. Where the plural exhaust gas processing devices are accommodated in the inside of the work vehicle as described above, it is difficult to keep a sufficient space for disposing the exhaust gas processing devices. Consequently, chances are that the work vehicle is enlarged. Even in the aforementioned work vehicle described in the above mentioned publication, the engine hood is enlarged due to the structure that the exhaust gas processing devices disposed on the counterweight are covered with the engine hood. It is an object of the present invention to inhibit increase in size of a vehicle body of a work vehicle embedded with a plurality of exhaust gas processing devices.

A work vehicle according to a first aspect of the present invention includes an engine, a hydraulic pump, a working unit, a first exhaust gas processing device and a second exhaust gas processing device. The hydraulic pump is aligned with the engine. The hydraulic pump is positioned lower than a top surface of the engine. The hydraulic pump is configured to be driven by a driving force from the engine. The working unit is configured to be driven by a hydraulic fluid from the hydraulic pump. The first exhaust gas processing device is configured to process an exhaust gas from the engine. The second exhaust gas processing device is disposed over the hydraulic pump. The second exhaust gas processing device is configured to process the exhaust gas from the engine. The first exhaust gas processing device is disposed closer to the engine than the second exhaust gas processing device is. The first exhaust gas processing device is positioned higher than the second exhaust gas processing device. The first exhaust gas processing device is partially overlapped with the second exhaust gas processing device in a top view.

A work vehicle according to a second aspect of the present invention relates to the work vehicle according to the first aspect of the present invention. The work vehicle further includes a connection pipe. One end of the connection pipe is connected to a lateral surface of the first exhaust gas processing device. The connection pipe passes over the second exhaust gas processing device. The other end of the connection pipe is connected to an upper part of the second exhaust gas processing device.

A work vehicle according to a third aspect of the present invention relates to the work vehicle according to the second aspect of the present invention. In the work vehicle, the connection pipe is disposed within a space positioned immediately above the second exhaust gas processing device and lower than a top surface of the first exhaust gas processing device.

A work vehicle according to a fourth aspect of the present invention relates to the work vehicle according to the first aspect of the present invention. The work vehicle further includes a first connection pipe, a second connection pipe and an exhaust pipe. One end of the first connection pipe is connected to the engine. The other end of the first connection pipe is connected to one of lateral surfaces of the first exhaust gas processing device. One end of the second connection pipe is connected to the other of the lateral surfaces of the first exhaust gas processing device. The second connection pipe passes over the second exhaust gas processing device. The other end of the second connection pipe is connected to an upper part of one of axial ends of the second exhaust gas processing device. The exhaust pipe is connected to an upper part of the other of the axial ends of the second exhaust gas processing device.

A work vehicle according to a fifth aspect of the present invention relates to the work vehicle according to the fourth aspect of the present invention. In the work vehicle, the first exhaust gas processing device and the second exhaust gas processing device are axially displaced from each other. The second connection pipe and the exhaust pipe are disposed over the second exhaust gas processing device while being axially aligned.

A work vehicle according to a sixth aspect of the present invention relates to the work vehicle according to the first aspect of the present invention. The work vehicle further includes a connection pipe. One end of the connection pipe is connected to a lower part of the first exhaust gas processing device. The connection pipe passes under the first exhaust gas processing device. The other end of the connection pipe is connected to a lateral surface of the second exhaust gas processing device.

A work vehicle according to a seventh aspect of the present invention relates to the work vehicle according to the sixth aspect of the present invention. In the work vehicle, the connection pipe is disposed within a space positioned immediately below the first exhaust gas processing device and higher than a bottom surface of the second exhaust gas processing device.

A work vehicle according to an eighth aspect of the present invention relates to the work vehicle according to the first aspect of the present invention. The work vehicle further includes a vehicle body frame and a coupling frame. The vehicle body frame is disposed in a surrounding of the engine and the hydraulic pump. The coupling frame couples the first exhaust gas processing device and the second exhaust gas processing device. The first exhaust gas processing device, the second exhaust gas processing device and the coupling frame form an exhaust gas processing unit. The exhaust gas processing unit is attached to the vehicle body frame by fixing the coupling frame to the vehicle body frame.

A work vehicle according to a ninth aspect of the present invention relates to the work vehicle according to the eighth aspect of the present invention. In the work vehicle, the coupling frame is fixed to the vehicle body frame through a vibration absorber member formed by an elastic element.

A work vehicle according to a tenth aspect of the present invention relates to the work vehicle according to one of the first to ninth aspects of the present invention. In the work vehicle, the first exhaust gas processing device is a processing device of a diesel particulate filter type. On the other hand, the second exhaust gas processing device is a processing device of a selective catalytic reduction type.

A work vehicle according to an eleventh aspect of the present invention relates to the work vehicle according to one of the first to ninth aspects of the present invention. In the work vehicle, the first exhaust gas processing device is a processing device of a selective catalytic reduction type. On the other hand, the second exhaust gas processing device is a processing device of a diesel particulate filter type.

According to the work vehicle of the first aspect of the present invention, the first and second exhaust gas processing devices are disposed closer to each other. Therefore, it is possible to reduce the space for disposing the first and second exhaust gas processing devices. Accordingly, it is possible to inhibit increase in size of the vehicle body of the work vehicle even when two exhaust gas processing devices are embedded in the work vehicle.

According to the work vehicle of the second aspect of the present invention, it is possible to reliably keep the connection pipe long even when the first and second exhaust gas processing devices are disposed closer to each other. Therefore, it is possible to manufacture the connection pipe having a bent shape more easily than the structure that the connection pipe is short.

According to the work vehicle of the third aspect of the present invention, it is possible to compactly dispose the first exhaust gas processing device, the second exhaust gas processing device and the connection pipe.

According to the work vehicle of the fourth aspect of the present invention, it is possible to reliably keep the path length of the first connection pipe and that of the second connection pipe long, and simultaneously, compactly dispose the first exhaust gas processing device, the second exhaust gas processing device, the first connection pipe, the second connection pipe and the exhaust pipe.

According to the work vehicle of the fifth aspect of the present invention, the first and second exhaust gas processing devices are axially displaced from each other. Therefore, the second connection pipe is disposed over the second exhaust gas processing device while being axially aligned with the exhaust pipe without interfering with the exhaust pipe. Accordingly, it is possible to compactly dispose the second connection pipe and the exhaust pipe.

According to the work vehicle of the sixth aspect of the present invention, it is possible to keep the connection pipe long even when the first and second exhaust gas processing devices are disposed closer to each other. Therefore, it is possible to manufacture the connection pipe having a bent shape more easily than the structure that the connection pipe is short.

According to the work vehicle of the seventh aspect of the present invention, it is possible to compactly dispose the first exhaust gas processing device, the second exhaust gas processing device and the connection pipe.

According to the work vehicle of the eighth aspect of the present invention, the first exhaust gas processing device, the second exhaust gas processing device and the coupling frame form the exhaust gas processing unit. Therefore, these components can be easily attached to or detached from the vehicle body.

According to the work vehicle of the ninth aspect of the present invention, the coupling frame is fixed to the vehicle body frame through the vibration absorber member. Therefore, vibration of the exhaust gas processing unit can be inhibited by the vibration absorber member.

According to the work vehicle of the tenth aspect of the present invention, only the first exhaust gas processing device can be detached from the coupling frame and be upwardly taken out from the vehicle body without detaching the second exhaust gas processing device from the coupling frame. The first exhaust gas processing device is a processing device of a diesel particulate filter type that requires more frequent maintenance works than a processing device of a selective catalytic reduction type. Therefore, maintenance performance can be enhanced due to the feature of easily taking out the first exhaust gas processing device from the vehicle body.

According to the work vehicle of the eleventh aspect of the present invention, only the second exhaust gas processing device can be detached from the coupling frame and be either horizontally or downwardly taken out from the vehicle body without detaching the first exhaust gas processing device from the coupling frame. The second exhaust gas processing device is a processing device of a diesel particulate filter type that requires more frequent maintenance works than a processing device of a selective catalytic reduction type. Therefore, maintenance performance can be enhanced due to the feature of easily taking out the second exhaust gas processing device from the vehicle body.

DESCRIPTION OF THE EMBODIMENTS

Figure 1:
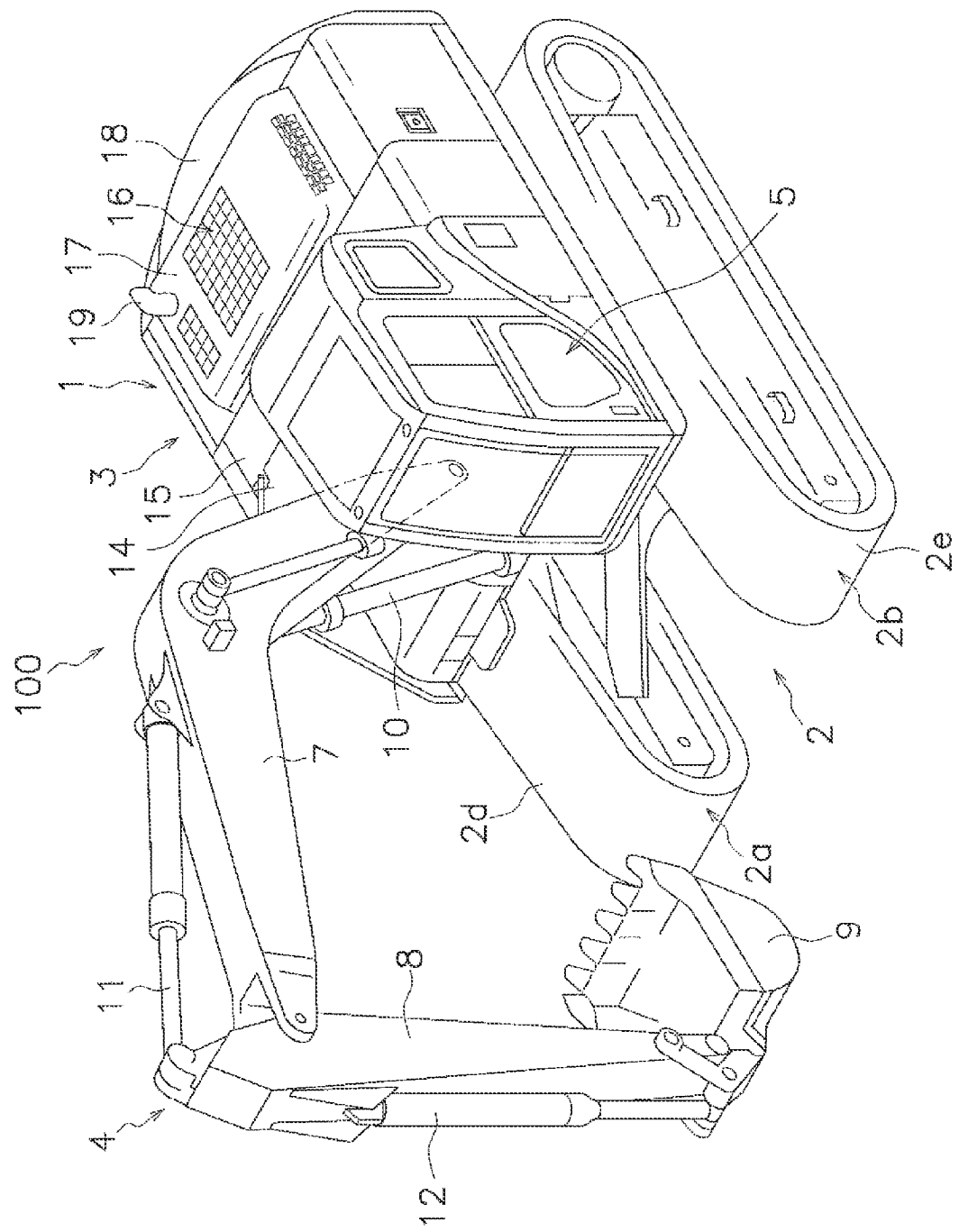
FIG. 1 is a perspective view of a work vehicle according to an exemplary embodiment of the present invention.

FIG. 1 illustrates a work vehicle 100 according to an exemplary embodiment of the present invention. The work vehicle 100 is a hydraulic excavator and includes a vehicle main body 1 and a working unit 4.

The vehicle main body 1 includes a travelling unit 2 and a revolving unit 3. The travelling unit 2 includes a pair of drive units 2a and 2b. The drive units 2a and 2b respectively have crawler belts 2d and 2e. The drive units 2a and 2b are configured to drive the crawler belts 2d and 2e by means of the driving force from an engine 21 to be described (see FIG. 2) for causing the work vehicle 100 to travel. It should be noted in the following explanation that "a back-and-forth direction" refers to the longitudinal direction of the vehicle main body 1. Further, "a right-and-left direction" or "a lateral/sideward direction" refers to a transverse/vehicle-width direction.

The revolving unit 3 is mounted on the travelling unit 2. The revolving unit 3 is revolvable with respect to the travelling unit 2. Further, a cab 5 occupies the front left part of the revolving unit 3. The revolving unit 3 includes a fuel tank 14, a hydraulic fluid tank 15, an engine compartment 16 and a counterweight 18. The fuel tank 14 stores fuel for driving the engine 21 to be described. The fuel tank 14 is disposed forwards of the hydraulic fluid tank 15. The hydraulic fluid tank 15 stores hydraulic fluid to be discharged from a hydraulic pump 23 to be described (see FIG. 2). The hydraulic fluid tank 15 is aligned with the fuel tank 14 in the back-and-forth direction. The engine compartment 16 accommodates a variety of devices including the engine 21 and the hydraulic pump 23 as described below. The engine compartment 16 is disposed rearwards of the operating room 5, the fuel tank 14 and the hydraulic fluid tank 15. The top side of the engine compartment 16 is covered with an engine hood 17. The engine hood 17 is attached to the vehicle body for opening and closing the engine compartment 16. The engine hood 17 has an aperture and a terminal part 19 attached to an exhaust pipe 34 to be described (see FIG. 2) is upwardly protruded through the aperture. The counterweight 18 is disposed rearwards of the engine compartment 16.

The working unit 4 is attached to the front center part of the revolving unit 3 and includes a boom 7, an arm 8, a bucket 9, a boom cylinder 10, an arm cylinder 11 and a bucket cylinder 12. The base end of the boom 7 is rotatably coupled to the revolving unit 3. On the other hand, the distal end of the boom 7 is rotatably coupled to the base end of the arm 8. The distal end of the arm 8 is rotatably coupled to the bucket 9. The boom cylinder 10, the arm cylinder 11 and the bucket cylinder 12 are hydraulic cylinders configured to be driven by the hydraulic fluid discharged from the hydraulic pump 23 to be described. The boom cylinder 10 is configured to actuate the boom 7. The arm cylinder 11 is configured to actuate the arm 8. The bucket cylinder 12 is configured to actuate the bucket 9. The working unit 4 is configured to be driven by the driving of the cylinders 10, 11 and 12.

Figure 2:
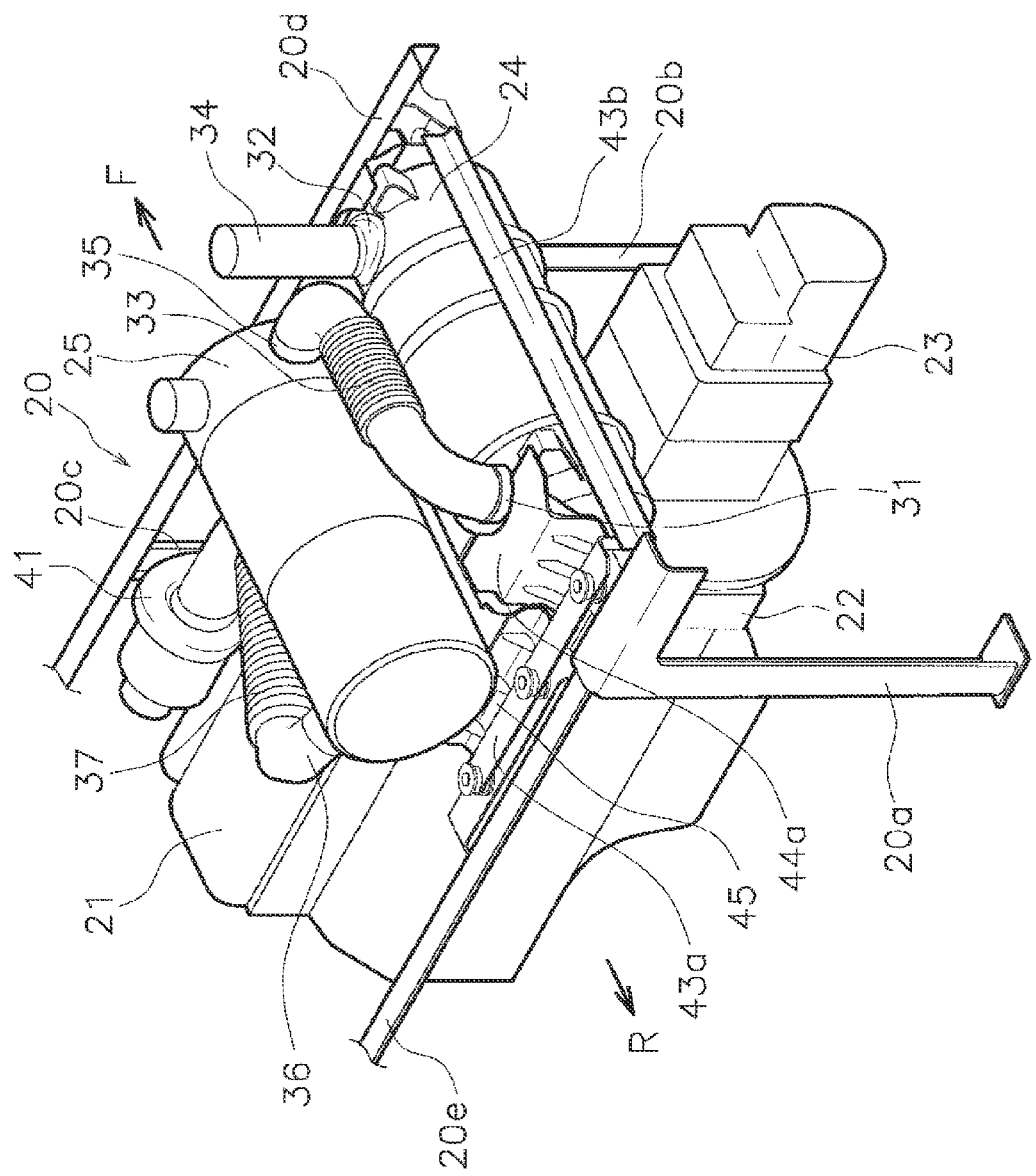
FIG. 2 is a perspective view of devices disposed in an engine compartment of the work vehicle.

FIG. 2 illustrates the internal structure of the engine compartment 16. The engine compartment 16 accommodates a vehicle body frame 20 and a variety of devices. The devices include the engine 21, a flywheel housing 22, the hydraulic pump 23, a first processing device 25 as a first exhaust gas processing device, a second processing device 24 as a second exhaust gas processing device and etc. It should be noted in FIG. 2 that an arrow F indicates the forward direction for the work vehicle 100 while an arrow R indicates the rearward direction for the work vehicle 100.

The vehicle body frame 20 is disposed in the surrounding of the aforementioned devices including the engine 21 and the hydraulic pump 23. The vehicle body frame 20 includes a plurality of pillar members 20a to 20c and a plurality of beam members 20d and 20e. The pillar members 20a to 20c stand upright on a main frame (not illustrated in the figures) of the revolving unit 3 while being disposed in the surrounding of the aforementioned devices. The beam members 20d and 20e are coupled to the top ends of the pillar members 20a to 20c while being disposed along the horizontal direction. Specifically, the beam member 20d is disposed forwards of the engine 21. The beam member 20e is disposed rearwards of the engine 21.

Figure 3:
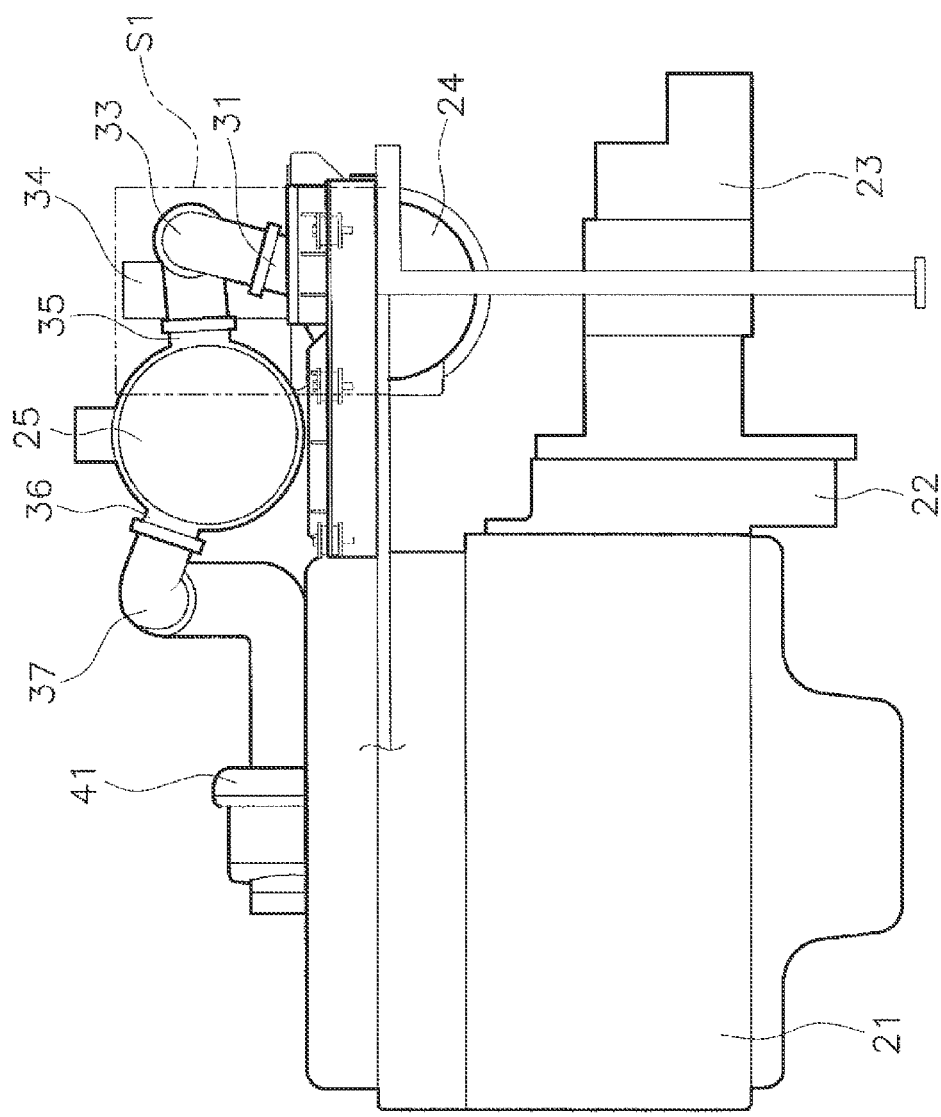
FIG. 3 is a rear view of the devices illustrated in FIG. 2.

The hydraulic pump 23 is configured to be driven by the driving force from the engine 21. As illustrated in FIG. 3, the hydraulic pump 23 is disposed laterally to the engine 21. In other words, the hydraulic pump 23 is aligned with the engine 21 in the vehicle-width direction. It should be noted that FIG. 3 is a rear view of the internal structure of the engine compartment 16 illustrated in FIG. 2. FIG. 3 omits illustration of the vehicle body frame 20 for easy understanding. The flywheel housing 22 is disposed between the engine 21 and the hydraulic pump 23. The hydraulic pump 23 is positioned lower than the top surface of the engine 21. Further, the top surface of the hydraulic pump 23 is positioned lower than the top surface of the flywheel housing 22. The flywheel housing 22 is attached to a lateral surface of the engine 21. Further, the hydraulic pump 23 is attached to a lateral surface of the flywheel housing 22.

Figure 4:
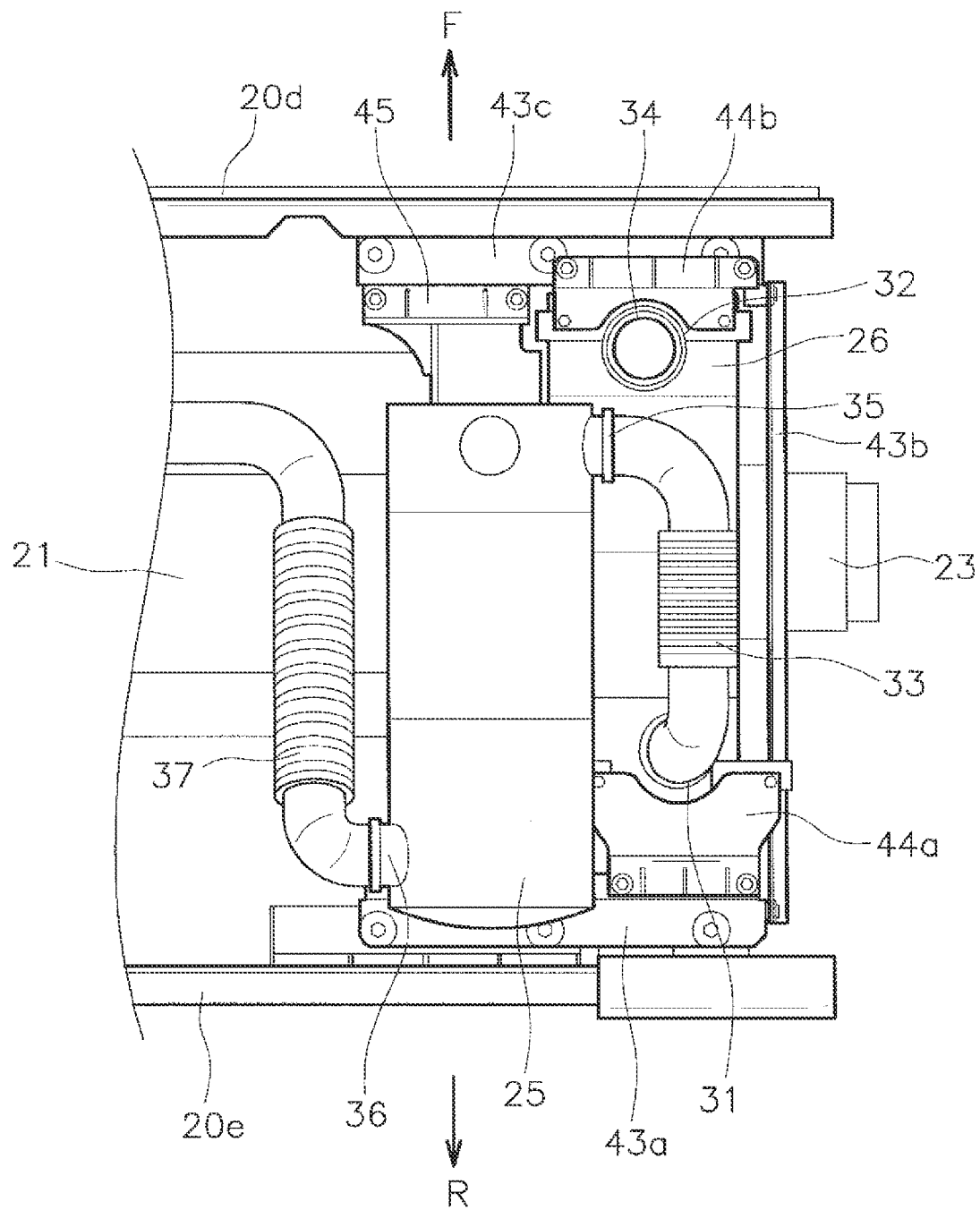
FIG. 4 is a partial top view of the devices illustrated in FIG. 2.

The first processing device 25 is a device configured to process the exhaust gas from the engine 21 and is specifically a processing device of a diesel particulate filter type. The first processing device 25 traps particulate substances contained in the exhaust gas with a filter and burns the trapped particulate substances using a heater attached to the filter. The first processing device 25 has a roughly cylindrical contour. The center axis of the first processing device 25 is arranged along the back-and-forth direction. Therefore, the center axis of the first processing device 25 is arranged roughly perpendicularly to the direction that the engine 21 and the hydraulic pump 23 are aligned side by side. Further, the center axis of the first processing device 25 is arranged roughly in parallel to the center axis of the second processing device 24. The center axis of the first processing device 25 is positioned higher than the center axis of the second processing device 24, while being arranged between the engine 21 and the center axis of the second processing device 24 in the vehicle-width direction. The first processing device 25 is disposed closer to the engine 21 than the second processing device 24 is, while being positioned higher than the second processing device 24. Further, the right-side part of the first processing device 25 is positioned over the second processing device 24 as illustrated in FIG. 3. Therefore, the first processing device 25 is disposed while being partially overlapped with the second processing device 24 in a top view as illustrated in FIG. 4. Further, the first processing device 25 is disposed while being displaced from the second processing device 24 in the back-and-forth direction. Specifically, the front end of the first processing device 25 is positioned rearwards of the front end of the second processing device 24. Further, the rear end of the first processing device 25 is positioned rearwards of the rear end of the second processing device 24.

The first processing device 25 includes a first connection port 36 and a second connection port 35. A first connection pipe 37 is connected to the first connection port 36. The first connection port 36 is disposed on the rear end of a lateral surface of the first processing device 25. The first connection port 36 is protruded leftwards and obliquely upwards from the lateral surface of the first processing device 25. The second connection port 35 is connected to a second connection pipe 33 to be described. The second connection port 35 is disposed on the front end of a lateral surface of the first processing device 25. The second connection port 35 is protruded rightwards from the lateral surface of the first processing device 25. The second connection port 35 is positioned rearwards of a fourth connection port 32 (to be described) of the second processing device 24. Therefore, the second connection pipe 33 connected to the second connection port 35 is disposed on the second processing device 24 while being aligned with the exhaust pipe 34 in the back-and-forth direction without extending towards the exhaust pipe 34. The second connection pipe 33 is thus disposed while being prevented from interfering with the exhaust pipe 34.

The second processing device 24 is a device configured to process the exhaust gas from the engine 21 and is specifically a processing device of s selective catalytic reduction type configured to hydrolyze urea and thereby selectively reduce only nitrogen oxides ($NO_x$). The second processing device 24 has a roughly cylindrical contour. The center axis of the second processing device 24 is arranged along the back-and-forth direction. Therefore, the center axis of the second processing device 24 is arranged roughly perpendicularly to the direction that the engine 21 and the hydraulic pump 23 are aligned side by side. The second processing device 24 is disposed over the hydraulic pump 23. In other words, the second processing device 24 is disposed while being overlapped with the hydraulic pump 23 in a top view. Further, the bottom part of the second processing device 24 is positioned lower than the top surface of the engine 21. In other words, the second processing device 24 is disposed while at least the bottom part thereof is overlapped with the engine 21 in a side view.

Further, as illustrated in FIGS. 2 and 4, the second processing device 24 includes a third connection port 31 and the fourth connection port 32. It should be noted that FIG. 4 is a top view of some of the devices illustrated in FIG. 3. The second connection pipe 33 is connected to the third connection port 31. The third connection port 31 is disposed on the top surface of the second processing device 24. Specifically, the third connection port 31 is disposed on the rear end of the top surface of the second processing device 24. The third connection port 31 is disposed while being protruded upwards from the top surface of the second processing device 24. The fourth connection port 32 is disposed on the front end of the top surface of the second processing device 24. The fourth connection port 32 is disposed while being protruded upwards from the top surface of the second processing device 24. The exhaust pipe 34 is connected to the fourth connection port 32. It should be noted that the aforementioned terminal part 19, upwardly protruded from the engine hood 17, is connected to the exhaust pipe 34 although not illustrated in FIGS. 2 to 5.

The first connection pipe 37 couples the engine 21 and the first processing device 25. One end of the first connection pipe 37 is connected to the lateral surface of the first processing device 25. On the other hand, the other end of the first connection pipe 37 is connected to an exhaust port of the engine 21 through a turbocharger 41. The first connection pipe 37 is disposed while passing over the engine 21. The front-side part of the first connection pipe 37 is bent towards the turbocharger 41 in the vehicle-width direction. On the other hand, the rear-side part of the first connection pipe 37 is bent towards the first connection port 36 of the first processing device 25 in the vehicle-width direction. The intermediate part of the first connection pipe 37 is disposed while being slanted with respect to the horizontal direction. Further, the intermediate part of the first connection pipe 37 has a corrugated shape for absorbing vibration of the engine 21 and the first processing device 25.

As illustrated in FIG. 2, the second connection pipe 33 couples the first processing device 25 and the second processing device 24. One end of the second connection pipe 33 is connected to the lateral surface of the first processing device 25. On the other hand, the other end of the second connection pipe 33 is connected to the top surface of the second processing device 24. The second connection pipe 33 is disposed while passing over the second processing device 24. More specifically, the second connection pipe 33 is disposed within a space (see a dashed two-dotted line S1 in FIG. 3). The space is arranged immediately above the second processing device 24 while being positioned lower than the top surface of the first processing device 25. The front-side part of the second connection pipe 33 is bent towards the second connection port 35 of the first processing device 25 in the vehicle-width direction. On the other hand, the rear-side part of the second connection pipe 33 is bent towards the third connection port 31 of the second processing device 24 in the up-and-down direction. The intermediate part of the second connection pipe 33 is extended along the back-and-forth direction. Further, the intermediate part of the second connection pipe 33 has a corrugated shape for absorbing vibration of the second processing device 24 and the first processing device 25.

The engine 21, the first connection pipe 37, the first processing device 25, the second connection pipe 33, the second processing device 24 and the exhaust pipe 34 are sequentially connected in series. Therefore, the exhaust gas from the engine 21 is transferred to the first processing device 25 through the first connection pipe 37. The first processing device 25 is configured to mainly reduce particulate substances contained in the exhaust gas. Next, the exhaust gas is transferred to the second processing device 24 through the second connection pipe 33. The second processing device 24 is configured to mainly reduce $NO_x$. Subsequently, the purified exhaust gas is discharged to the outside through the exhaust pipe 34.

Figure 5:
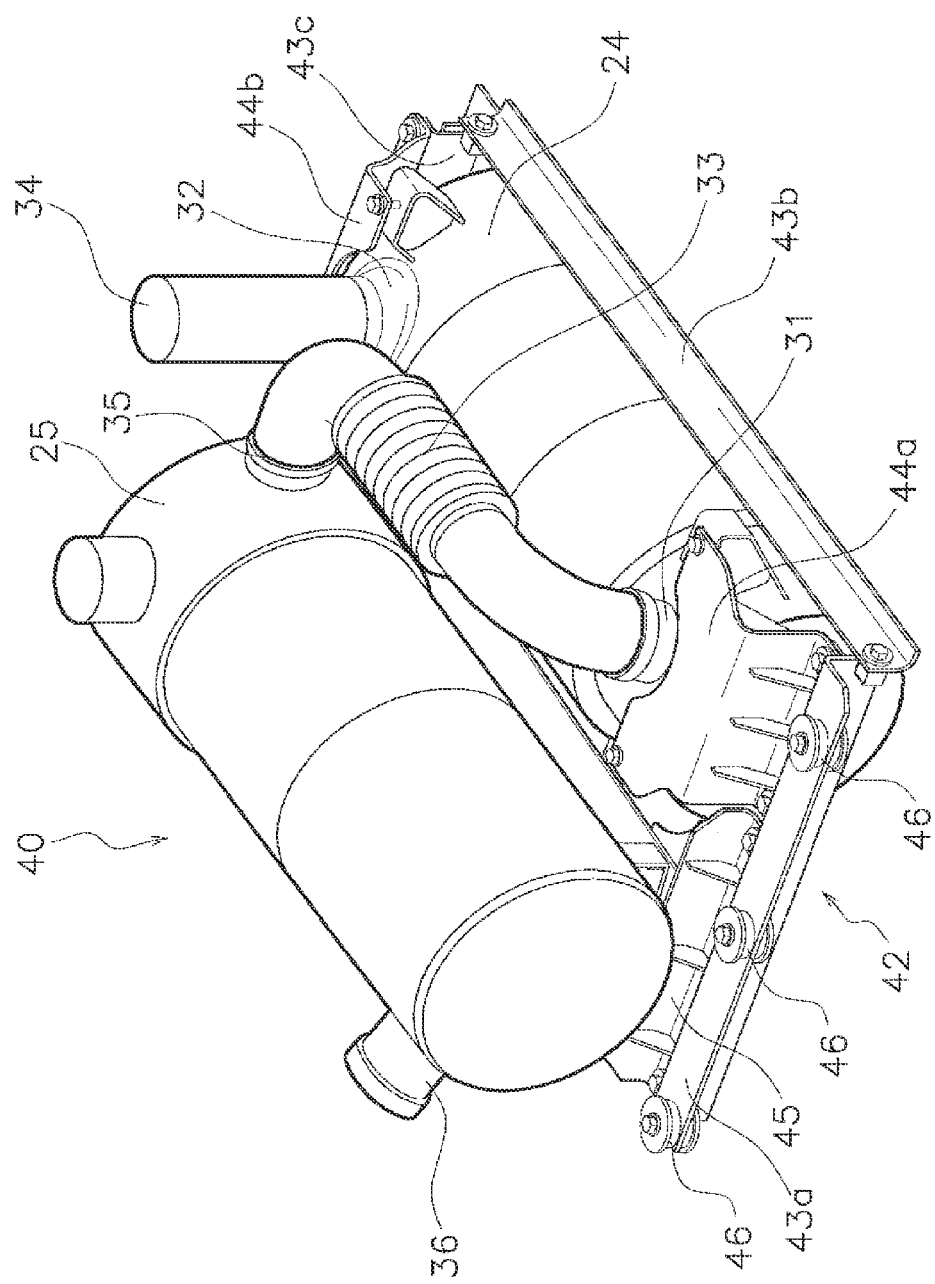
FIG. 5 is a perspective view of an exhaust gas processing unit.

As illustrated in FIG. 5, the first processing device 25 and the second processing device 24 are coupled through a coupling frame 42. Accordingly, the first processing device 25, the second processing device 24 and the coupling frame 42 are integrated and form an exhaust gas processing unit 40. The exhaust gas processing unit 40 is attached to the vehicle body frame 20 by fixing the coupling frame 42 to the vehicle body frame 20. Conversely, the exhaust gas processing unit 40 is detached from the vehicle body frame 20 by unfixing the coupling frame 42 from the vehicle body frame 20.

Figure 6:
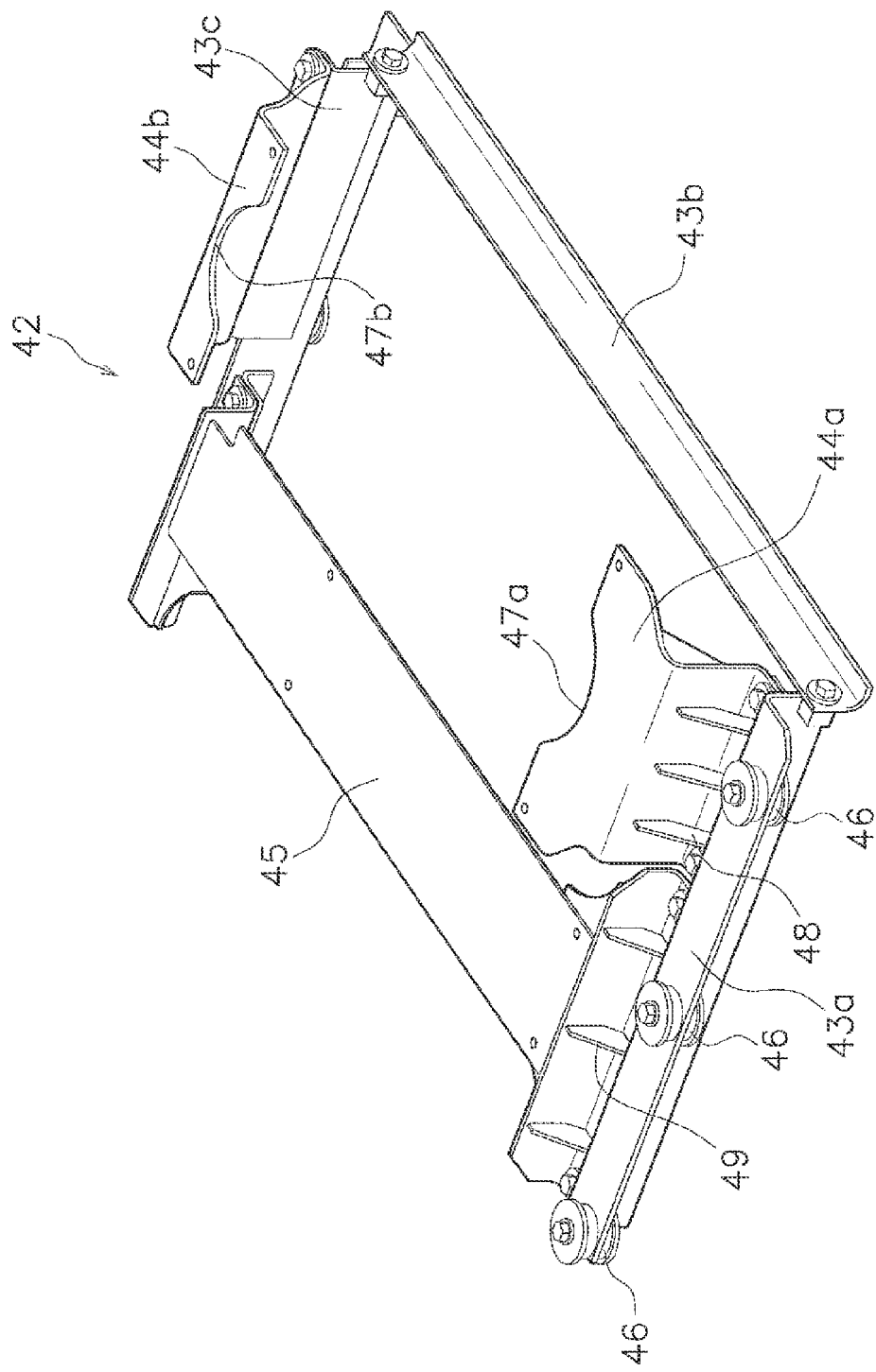
FIG. 6 is a perspective view of a coupling frame for the exhaust gas processing unit.

As illustrated in FIG. 6, the coupling frame 42 includes a plurality of frame members 43a to 43c, a first bracket 45 and a pair of second brackets 44a and 44b. The frame members 43a to 43c are combined in a folded shape for surrounding the first processing device 25 and the second processing device 24. As illustrated in FIG. 5, the frame members 43a to 43c are fixed to the vehicle body frame 20 through vibration absorber members 46 made of elastic elements such as rubber. Specifically, the frame member 43a is fixed to the beam member 20e as illustrated in FIG. 2. Further, the fame member 43c is fixed to the beam member 20d although not illustrated in the figure.

As illustrated in FIG. 5, the first bracket 45 is a member for attaching the first processing device 25 to the frame members 43a to 43c. The first bracket 45 is disposed astride the frame member 43a and the frame member 43c. The bottom part of the first processing device 25 is positioned higher than the frame members 43a to 43c. The first processing device 25 is fixed to the frame members 43a to 43c while being disposed on the first bracket 45.

As illustrated in FIG. 5, the second brackets 44a and 44b are members for attaching the second processing device 24 to the frame members 43a to 43c. The second brackets 44a and 44b are disposed away from each other in the axial direction of the second processing device 24. The second brackets 44a and 44b are respectively fixed to the axial ends of the second processing device 24. The bottom part of the second processing device 24 is positioned lower than the frame members 43a to 43c. The second brackets 44a and 44b are disposed partially over the second processing device 24. Therefore, the second processing device 24 is fixed to the second brackets 44a and 44b while being suspended therefrom. Further, as illustrated in FIG. 6, the second bracket 44a includes a recess 47a on an end thereof for avoiding interference with the second connection pipe 33, while the second bracket 44b includes a recess 47b on an end thereof for avoiding interference with the exhaust pipe 34.

As illustrated in FIG. 6, each of the second brackets 44a and 44b is provided with a plurality of ribs 48. Further, the first bracket 45 is provided with a plurality of ribs 49. Accordingly, stiffness of the second brackets 44a and 44b and that of the first bracket 45 are enhanced. It should be noted that reference numerals 48 and 49 are assigned to some of the corresponding ribs in FIG. 6. Further, the second brackets 44a and 44b are fixed to the second processing device 24 and the frame members 43a and 43c without using vibration absorber members. The first bracket 45 is fixed to the first processing device 25 and the frame members 43a and 43c without using vibration absorber members. Therefore, the second processing device 24, the first processing device 25 and the coupling frame 42 are rigidly coupled to each other while unitarily vibrating.

The work vehicle 100 according to the present exemplary embodiment has the following features.

The first and second processing devices 25 and 24 are disposed closely adjacent to each other due to the structure the arrangement thereof overlapped in a top view. Therefore, it is possible to reduce the space for disposing the first and second processing devices 25 and 24. Accordingly, it is possible to inhibit increase in size of the vehicle body of the work vehicle 100 even when two exhaust gas processing devices are embedded therein.

Further, the first and second processing devices 25 and 24 are herein overlapped in a top view. However, the first processing device 25 is positioned higher than the second processing device 24. Therefore, only the first processing device 25 can be detached from the coupling frame 42 and taken out of the vehicle body without detaching the second processing device 24 from the coupling frame 42. The first processing device 25 is configured to trap particulate substances and therefore requires more frequent maintenance works than the second processing device 24. In view of this, easy detachment of the first processing device 25 results in enhancement of maintenance performance.

The second connection pipe 33 is connected to the lateral surface of the first processing device 25 and the top surface of the second processing device 24 while passing over the second processing device 24. In other words, the space over the second processing device 24 is used as the space for disposing the second connection pipe 33. Further, the second and third connection ports 35 and 31 are disposed away from each other in the axial direction of the first and second processing devices 25 and 24. Therefore, it is possible to reliably keep the second connection pipe 33 long even when the first and second processing devices 25 and 24 are disposed closer to each other. Consequently, it is possible to more easily assemble the second connection pipe 33 having a bent shape than the structure that the second connection pipe 33 is short. Further, it is possible to enhance the action of regulating the flow of the exhaust gas in the second connection pipe 33.

The first processing device 25, the second processing device 24 and the coupling frame 42 form the exhaust gas processing unit 40. Therefore, it is easy to attach/detach the first and second processing devices 25 and 24 to/from the vehicle body.

The first processing device 25, the second processing device 24 and the coupling frame 42 are coupled to each other while unitarily vibrating. It is thereby possible to inhibit the first and second processing devices 25 and 24 from separately vibrating from each other. This can reduce load acting on the second connection pipe 33. Further, the coupling frame 42 is fixed to the vehicle body frame 20 through the vibration absorber member 46. Therefore, the vibration absorber member 46 can inhibit vibration of the exhaust gas processing unit 40.

An exemplary embodiment of the present invention has been described above. However, the present invention is not limited to the aforementioned exemplary embodiment, and a variety of changes can be made without departing from the scope of the present invention. For example, the present invention can be applied to the other work vehicles other than the hydraulic excavators.

Figure 7:
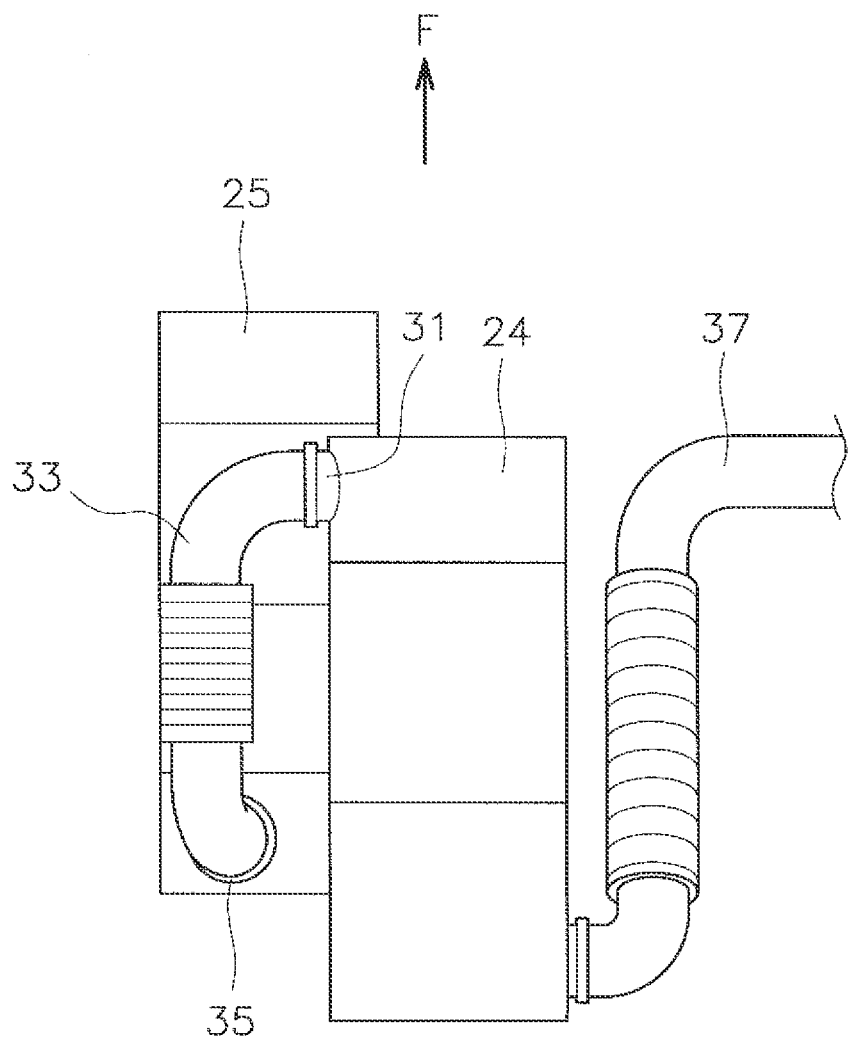
FIG. 7 is a bottom view of a first processing device and a second processing device according to another exemplary embodiment of the present invention.
Figure 8:
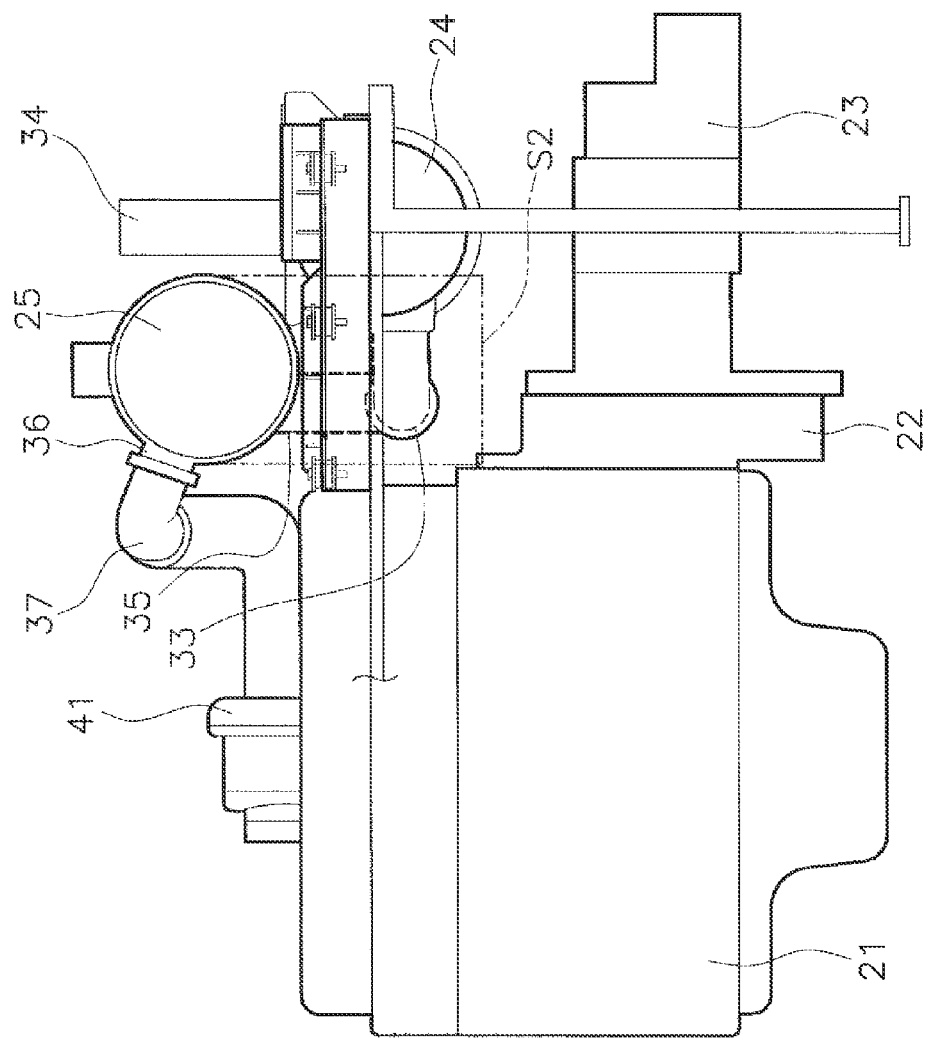
FIG. 8 is a rear view of devices including a first processing device, a second processing device and a second connection pipe according to the aforementioned another exemplary embodiment of the present invention.

Further, the second connection pipe 33 may be disposed while passing under the first processing device 25. In this case, as illustrated in FIGS. 7 and 8, one end of the second connection pipe 33 is connected to the bottom surface of the first processing device 25 while the other end of the second connection pipe 33 is connected to a lateral surface of the second processing device 24. Specifically, the second connection port 35 is disposed on the bottom surface of the first processing device 25 while the third connection port 31 is disposed on the lateral surface of the second processing device 24. The second connection pipe 33 is disposed within a space (see a dashed two-dotted line depicted in FIG. 8) that is arranged immediately below the first processing device 25 and higher than the bottom surface of the second processing device 24. It should be noted that FIG. 7 is a bottom view of the first and second processing devices 25 and 24. FIG. 8 is a rear view of devices including the first processing device 25, the second processing device 24 and the second connection pipe 33.

The first processing device 25 may be entirely positioned higher than the second processing device 24. However, it is more preferable to position the bottom part of the first processing device 25 lower than the top surface of the second processing device 24 as described in the aforementioned exemplary embodiment. This is because the space for disposing the first and second processing devices 25 and 24 can be thereby more compactly produced.

Figure 9:
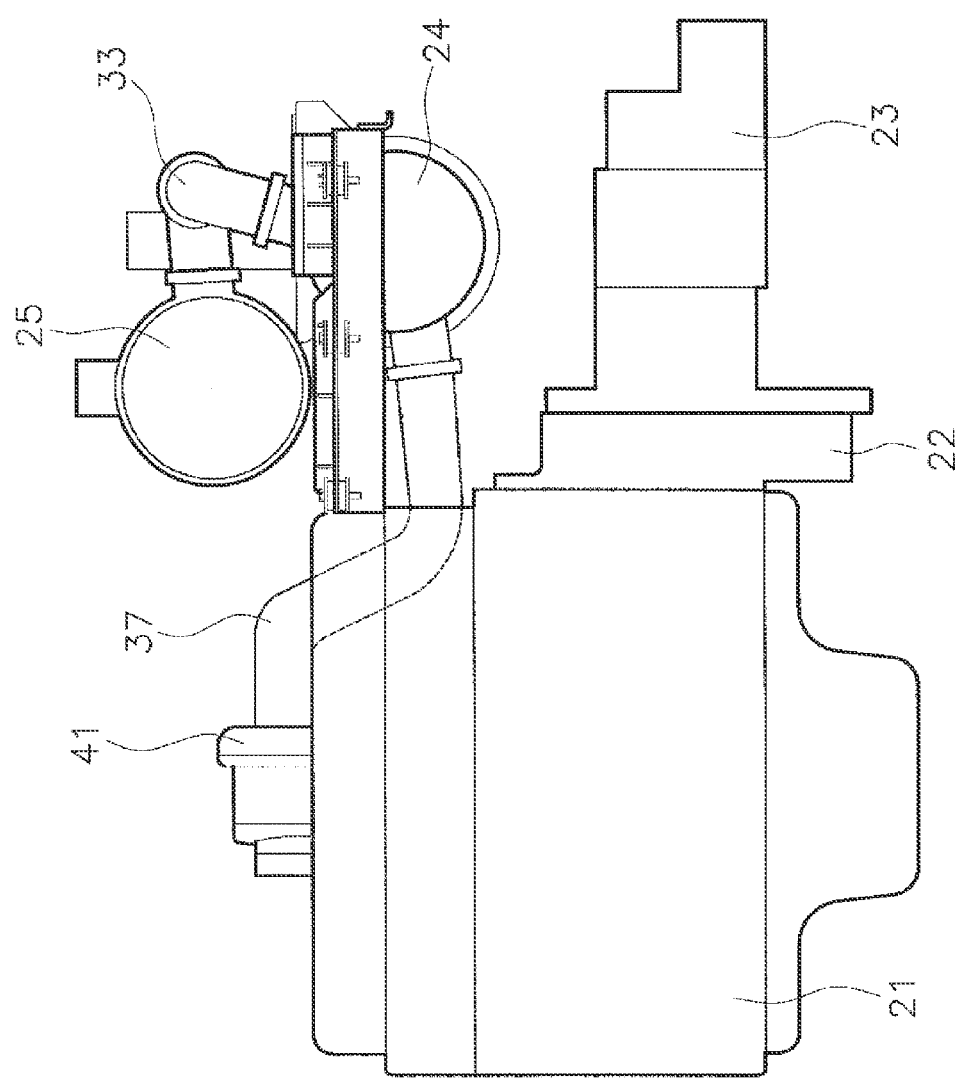
FIG. 9 is a diagram illustrating arrangement of a first processing device, a second processing device and a first connection pipe according to yet another exemplary embodiment.

Contrary to the aforementioned exemplary embodiment, the second processing device 24 may be a processing device of the diesel particulate filter type while the first processing device 25 may be a processing device of a selective catalytic reduction type. In this case, it is required to dispose the second processing device 24 upstream of the first processing device 25 in the exhaust gas flow. Therefore, the first connection pipe 37 is disposed as illustrated in FIG. 9. The structure of the second connection pipe 33 is similar to that described in the aforementioned exemplary embodiment. In this case, maintenance performance can be enhanced by downwardly taking out the second processing device 24, similarly to the aforementioned exemplary embodiment.

The structure and arrangement of the first processing device 25 and those of the second processing device 24, described in the aforementioned exemplary embodiment, may be contrary to each other in the back-and-forth direction. For example, the first processing device 25 may be forwardly displaced from the second processing device 24. Further, the arrangement of the second connection port 35 and that of the first connection port 36, described in the aforementioned exemplary embodiment, may be contrary to each other in the back-and-forth direction, while the arrangement of the third connection port 31 and that of the fourth connection port 32, described in the aforementioned exemplary embodiment, may be contrary to each other in the back-and-forth direction.

Orientations of the engine 21, the hydraulic pump 23, the first processing device 25, the second processing device 24 and etc. disposed on the vehicle body may not be limited to those described above. For example, the engine 21 and the hydraulic pump 23 may be aligned in the back-and-forth direction of the vehicle body. Further, arrangements of devices including the first processing device 25, the second processing device 24 and etc. may be arbitrarily changed in accordance with the arrangements of the engine 21 and the hydraulic pump 23. In this case, "the vehicle width direction" may be interpreted as a direction that the engine 21 and the hydraulic pump 23 are aligned in the aforementioned explanation. Further, "the right side" may be interpreted as the pump side, while "the left side" may be interpreted as the engine side.

An exhaust gas processing device of a type different from the aforementioned types may be used as either the first exhaust gas processing device or the second exhaust gas processing device. For example, either a device of an OC (Oxidation Catalyst) type or a device of a LNT (Lean NO$_x$ Trap) type may be used.

According to the above described embodiments of the present invention, it is possible to inhibit increase in size of a vehicle body of a work vehicle embedded with a plurality of exhaust gas processing devices.

The invention claimed is:

1. A work vehicle comprising:
   an engine;
   a hydraulic pump aligned with the engine, the hydraulic pump being positioned lower than a top surface of the engine, the hydraulic pump being configured to be driven by a driving force from the engine;
   a working unit configured to be driven by a hydraulic fluid from the hydraulic pump;
   a first exhaust gas processing device configured to process an exhaust gas from the engine;
   a second exhaust gas processing device disposed over the hydraulic pump, the second exhaust gas processing device being configured to process the exhaust gas from the engine; and
   a first connection pipe, one end of the first connection pipe being connected to the engine, the other end of the first connection pipe being connected to the second exhaust gas processing device,
   wherein the first exhaust gas processing device is disposed closer to the engine than the second exhaust gas processing device, the first connection pipe is connected to the second exhaust gas processing device while passing below the first processing device.

2. The work vehicle according to claim 1, further comprising:
   a second connection pipe passing over the second exhaust gas processing device, one end of the second connection pipe being connected to a lateral surface of the first exhaust gas processing device, the other end of the second connection pipe being connected to an upper part of the second exhaust gas processing device.

3. The work vehicle according to claim 1, further comprising:
   a second connection pipe passing over the second exhaust gas processing device, one end of the second connection pipe being connected to a lateral surface of the first exhaust gas processing device, the other end of the second connection pipe being connected to an upper part of the second exhaust gas processing device; and
   an exhaust pipe connected to an upper part of the first exhaust gas processing device.

4. The work vehicle according to claim 1, further comprising:
   a vehicle body frame disposed in a surrounding of the engine and the hydraulic pump; and
   a coupling frame coupling the first exhaust gas processing device and the second exhaust gas processing device,
   wherein the first exhaust gas processing device, the second exhaust gas processing device and the coupling frame form an exhaust gas processing unit, and
   the exhaust gas processing unit is attached to the vehicle body frame by fixing the coupling frame to the vehicle body frame.

5. The work vehicle according to claim 1, wherein
   the first exhaust gas processing device is a processing device of a diesel particulate filter type, and
   the second exhaust gas processing device is a processing device of a selective catalytic reduction type.

6. The work vehicle according to claim 1, wherein
   the first exhaust gas processing device is a processing device of a selective catalytic reduction type, and
   the second exhaust gas processing device is a processing device of a diesel particulate filter type.

7. The work vehicle according to claim 2, wherein
   the second connection pipe is disposed within a space positioned immediately above the second exhaust gas processing device and lower than a top surface of the first exhaust gas processing device.

8. The work vehicle according to claim 3, wherein
   the first exhaust gas processing device and the second exhaust gas processing device are axially displaced from each other, and
   the second connection pipe and the exhaust pipe are disposed over the second exhaust gas processing device, the second connection pipe and the exhaust pipe being axially aligned.

9. The work vehicle according to claim 4, wherein
   the coupling frame is fixed to the vehicle body frame through a vibration absorber member formed by an elastic element.

* * * * *